United States Patent [19]

Takahashi

[11] Patent Number: 5,677,976
[45] Date of Patent: Oct. 14, 1997

[54] OPTICAL ATTENUATION FIBER ASSEMBLY

[75] Inventor: Mitsuo Takahashi, Matsudo, Japan

[73] Assignee: Seikoh Giken Co., Ltd., Chiba-ken, Japan

[21] Appl. No.: 618,206

[22] Filed: Mar. 19, 1996

[30] Foreign Application Priority Data

Aug. 25, 1995 [JP] Japan .................. 7-240988

[51] Int. Cl.$^6$ .............. G02B 6/255; G02B 6/36
[52] U.S. Cl. .............. 385/140; 385/51; 385/72; 385/85; 385/96
[58] Field of Search ............... 385/15, 27, 39, 385/51, 95–98, 123, 124, 140, 60, 72, 78, 85

[56] References Cited

U.S. PATENT DOCUMENTS

| | | | |
|---|---|---|---|
| 4,723,828 | 2/1988 | Garel-Jones et al. | 385/124 X |
| 4,728,170 | 3/1988 | Robertson | 385/140 |
| 5,109,468 | 4/1992 | Tamulevich et al. | 385/140 |
| 5,216,728 | 6/1993 | Charlton et al. | 385/27 |
| 5,384,885 | 1/1995 | Diner | 385/140 |

FOREIGN PATENT DOCUMENTS

| | | |
|---|---|---|
| 0 294 037 | 12/1988 | European Pat. Off. . |
| 42 37 735 | 1/1994 | Germany . |
| 54-2754 | 1/1979 | Japan . |

*Primary Examiner*—John D. Lee
*Attorney, Agent, or Firm*—Spencer & Frank

[57] ABSTRACT

A mass-producible optical attenuation fiber assembly is provided with a first optical fiber with a predetermined attenuation, a second optical fiber connected to a first end of the first optical fiber and a ferrule for fixedly holding the other end of the first optical fiber. In this optical attenuation fiber assembly, the first optical fiber is doped with impurities to achieve a predetermined first attenuation and shortened to obtain a predetermined second attenuation. In the optical attenuation fiber assembly, the second optical fiber may also be cut to a fixed length and the cut edge portion of the second optical fiber may be fixed to another ferrule and polished. The latter ferrule is coupled to the former ferrule through an alignment sleeve.

17 Claims, 5 Drawing Sheets

OPTICAL ATTENUATION FIBER ASSEMBLY

BACKGROUND OF THE INVENTION

1. Field of the Invention

The present invention relates to a new optical attenuation fiber assembly produced by using an optical fiber (hereunder referred to as an optical attenuation fiber), which is intentionally doped with impurities and thus posseses definite optical attenuation characteristics (i.e., the first attenuation). More particularly, the present invention relates to an optical attenuation fiber assembly which can accurately impart a fixed optical attenuation coefficient to an optical attenuation fiber used therein, even if it is difficult to manufacture the optical attenuation fiber, by precisely controlling the optical attenuation per predetermined length of the fiber (namely, the attenuation coefficient thereof).

2. Description of the Related Art

The inventor of the present invention has produced an optical attenuator of the connector type or an optical attenuator connectable to a connector by utilizing an optical fiber has doped with impurities and thus having a large optical attenuation coefficient or optical attenuation per unit fiber length.

FIG. 8 is a sectional view of the optical attenuator of the connector type known in the prior art. FIG. 9 is a sectional view of the ferrule assembly portion taken out of the optical attenuator of FIG. 8. A through hole 2 is bored in the central portion of a cylindrical ferrule 1 of the ferrule assembly portion of FIG. 9 for use in the optical attenuator. The optical attenuation fiber 3 is inserted into this through hole 2 and is glued to the inner surface thereof. Further, a flange 4 is fixed onto the circumferential surface of the ferrule 1. This flange 4 serves to limit the positions of the ferrule assembly portion within the optical attenuator in the axial and circumferential directions.

In FIG. 8, a plug housing consists of body components 5A and 5B. Further, an alignment sleeve 7 is provided in the component 5A. An end part of the cylindrical ferrule 1 of the ferrule assembly portion of FIG. 9 is inserted into one end of the alignment sleeve 7 and is connected to the component 5B in such a way that the component 5B inhibits the rotation of the flange 4. A coupling nut 6 is rotatably mounted on the plug housing component 5B.

An optical fiber plug having an attenuator at an edge portion thereof is formed by connecting a ferrule of another optical fiber connector (not shown) with the other end of the alignment sleeve 7.

Here, supposing that the axial length L of the ferrule 1 is constant and the optical attenuation per unit length of the optical attenuation fiber is A dB, the optical attenuator would have a total attenuation of L×A dB. Generally, an optical attenuation of 3, 5, 10, 15 or 20 dB is required of an optical attenuator. Further, arbitrary intermediate attenuation values such as 8±0.8 dB and 13±1.3 dB are sometimes required of the attenuator when utilized for some uses.

In this case, if there is a variation or error in optical attenuation per unit length of an optical fiber of the aforementioned type, some problems occur. For example, if the desired optical attenuation is 20±2 dB and the axial length L of the ferrule 1 is 20 mm, the optical fiber should be produced in such a way that the optical attenuation per unit length of the optical fiber is A with an error of not over ±10%.

However, in view of the current state of art in optical fiber manufacturing technology, when optical fibers are produced stably, the optical attenuation per unit length of the optical fiber becomes A with an error of ±20% or so. Thus, if L=20 mm, the optical attenuation per unit length of the optical fiber becomes large, namely, 20±4 dB. Consequently, the value of the optical attenuation per unit length of the optical fiber cannot be within the specification.

If optical fibers, whose optical attenuation per unit length is A with an error of not over ±10%, are selected, the percentage of defective optical fibers becomes inevitably large. Because of the difficulty in regulating the lengths of the ferrules 1 individually, there is the necessity of checking the produced optical attenuation fibers and selecting and using only acceptable optical attenuation fibers. Thus, inevitably, the manufacturing cost becomes high.

Optical attenuation fibers are adapted to absorb light as a result of doping the silicon glass of ordinary optical fibers with impurities such as Co and Cr. The management of the manufacturing process thereof is not easy. Moreover, it is extremely difficult to obtain desired attenuation characteristics per unit length of an optical attenuation fiber. However, nearly uniform attenuation characteristics can be obtained in a single lot.

Accordingly, an object of the present invention is to realize the mass production of optical attenuation fiber assemblies, which can provide arbitrary desired attenuation, by using optical attenuation fibers.

Another object of the present invention is to provide optical attenuation fiber assemblies of various forms, which can be used for various uses.

SUMMARY OF THE INVENTION

TO achieve the foregoing objects, in accordance with the present invention, there is provided an optical attenuation fiber assembly which comprises an optical attenuation fiber, an ordinary optical fiber connected to an end portion of the optical attenuation fiber, and a first ferrule for accepting and fixing the other end portion of the optical attenuation fiber.

The optical attenuation fiber is cut or shortened by being polished in such a manner as to be able to obtain a predetermined attenuation (i.e., the second attenuation) when connected to the ordinary optical fiber before or after being fixed to the ferrule.

In the case of the aforementioned optical attenuation fiber assembly, a connection between the optical attenuation fiber and the ordinary optical fiber may be made by performing a fusion splicing through the use of a discharge arc.

Further, in the case of the aforementioned optical attenuation fiber assembly, the ordinary optical fiber may be cut to a fixed length. Moreover, a cut edge portion of the ordinary optical fiber may be fixed to a second ferrule and polished. Furthermore, the second ferrule may be coupled to the first ferrule through an alignment sleeve.

In the optical attenuation fiber assembly using the two ferrules, an angular positioning flange may be provided in such a manner as to be integral with the alignment sleeve.

In the optical attenuation fiber assembly, the end surfaces of the optical attenuation fiber and the first ferrule and the end surfaces of the ordinary optical fiber and the second ferrule are polished slantwise with respect to a plane perpendicular to the optical axis thereof. Thereby, the reflection loss can be reduced.

Moreover, in the optical attenuation fiber assembly, the end surface of each of the ferrules may be a face inclined at an angle of 8 degrees or more to the plane perpendicular to the optical axis thereof and further may be polished into a spherical surface. Thereby, the reflection loss can be further reduced.

In the optical attenuation fiber assembly, the ferrules are optical fiber connector ferrules. The connecting position, at which the ferrule is connected to the ordinary optical fiber, is established in the ferrule. Moreover, a coating or covering portion of the ordinary optical fiber is fixed to a pipe with a flange, which is secured to the ferrule. Thus, the optical attenuation fiber assembly is formed in such a manner as to be of the type in which the optical attenuation fiber connection assembly is built into the optical fiber connector ferrule.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Figure 4:
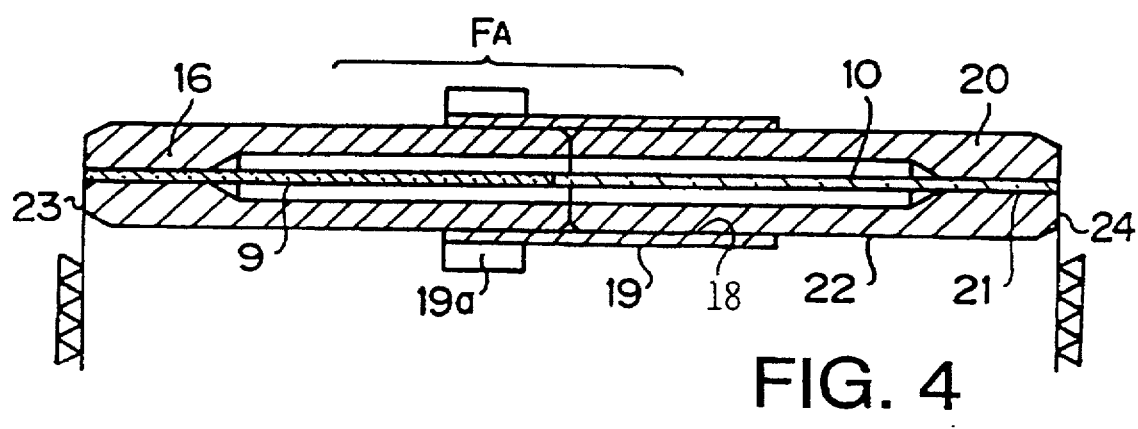
FIG. 4 is a sectional view of the optical attenuation fiber assembly embodying the present invention, namely, an embodiment of the present invention which is produced by undergoing the assembling step of FIG. 3.

Hereinafter, preferred embodiments of the present invention will be described in detail by referring to the accompanying drawings. FIG. 4 is a sectional view of an optical attenuation fiber assembly (FA) embodying the present invention, namely, an embodiment of the present invention.

Figure 1:
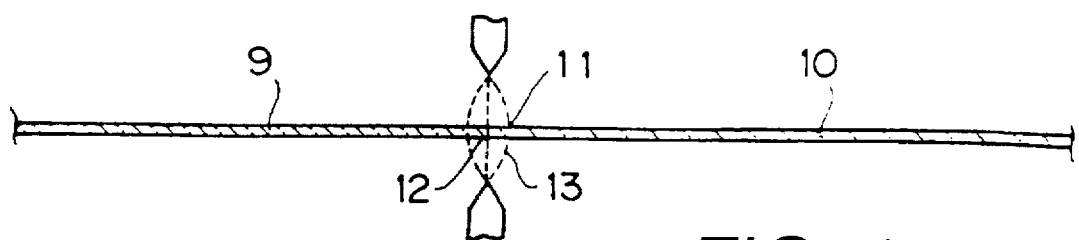
FIG. 1 is a sectional diagram illustrating the step of welding an optical attenuation fiber assembly embodying the present invention.
Figure 2:
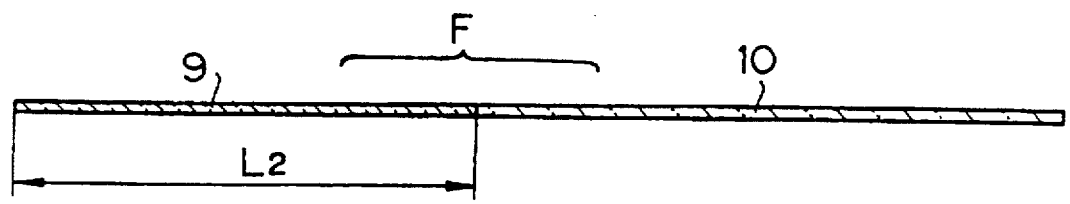
FIG. 2 is a sectional view of an optical attenuation fiber connection assembly connected by performing the welding step of FIG. 1.
Figure 3:
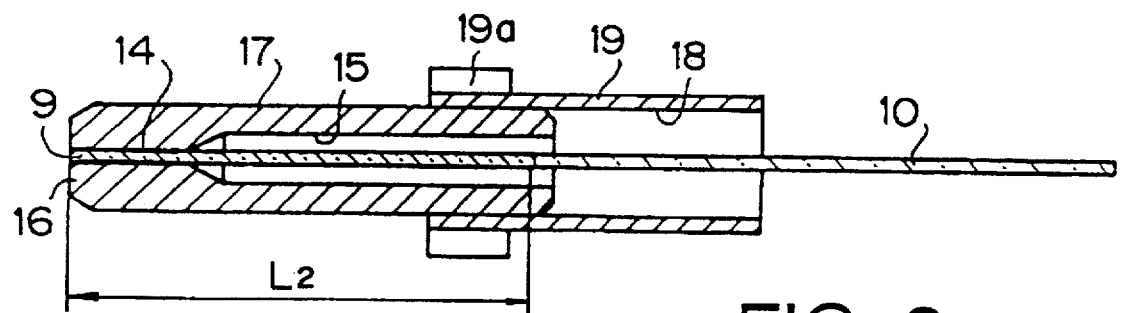
FIG. 3 is a sectional view of the optical attenuation fiber assembly embodying the present invention, namely, an embodiment of the present invention, which uses the optical attenuation fiber connection assembly, for illustrating the step of assembling the optical attenuation fiber assembly.

FIG. 1 is a sectional diagram illustrating the step of welding the optical attenuation fiber assembly (FA) embodying the present invention. FIG. 2 is a sectional view of an optical attenuation fiber connection assembly (F) connected by performing the welding step of FIG. 1. FIG. 3 is a sectional view of the optical attenuation fiber assembly (FA), which uses the optical attenuation fiber connection assembly (F), for illustrating the step of assembling the optical attenuation fiber assembly.

As illustrated in FIG. 1, an end surface 11 of an optical attenuation fiber 9 is butted against an end surface 12 of an ordinary optical fiber 10. Then, a fusion splicing is performed on the end surfaces 11 and 12 by using a discharge arc 13. Subsequently, as illustrated in FIG. 2, the optical attenuation fiber 9 is cut to a length $L_2$, by which desired optical attenuation is obtained. Moreover, the ordinary optical fiber 10 is also cut to an appropriate length. Thus an optical attenuation fiber connection assembly (F) is formed.

As shown in FIG. 3, a central minute through hole 14, which is used to precisely accept an end portion of the optical attenuation fiber 9, and a stepped or counterbored hole 15 are bored in the central portion of the cylindrical ferrule 16. Further, another through hole 18, into which the outside cylindrical surface 17 of a ferrule 16 is inserted, is bored in a cylindrical alignment sleeve 19 on which is located a flange 19a. A nearly half-length part of the ferrule 16 is inserted into and glued to the cylindrical alignment sleeve 19. Then, the optical attenuation fiber 9 of the optical attenuation fiber connection assembly (F) is inserted into and glued to the central minute through hole 14 of the first ferrule 16.

Two ferrules are used in the optical attenuation fiber assembly of the present invention because the optical attenuation fiber and the ordinary optical fiber cannot be inserted into the same central minute through hole 14 owing to the fact that the optical axes of the optical attenuation fiber and the ordinary optical fiber cannot be aligned (namely, the misalignment between the optical axes thereof) at the fusion splicing connection portion therebetween, and to the deformation of these optical fibers.

The ordinary optical fiber 10 is therefore inserted into and fixed to a second ferrule 20 which is of substantially the same shape as the first ferrule 16. As shown in FIG. 4, the ordinary optical fiber 10 is inserted into and glued to the central minute through hole 21 of the second ferrule 20. Simultaneously, the outside cylindrical surface 22 of the second ferrule 20 is inserted into and glued to the through hole 18 in alignment sleeve 19 on which is located flange 19a. Thereafter, a polishing finish is put on each of the end surfaces 23 and 24 of each ferrule 16 and 20. Thereby, the optical attenuation fiber assembly (FA) is obtained.

Figure 5:
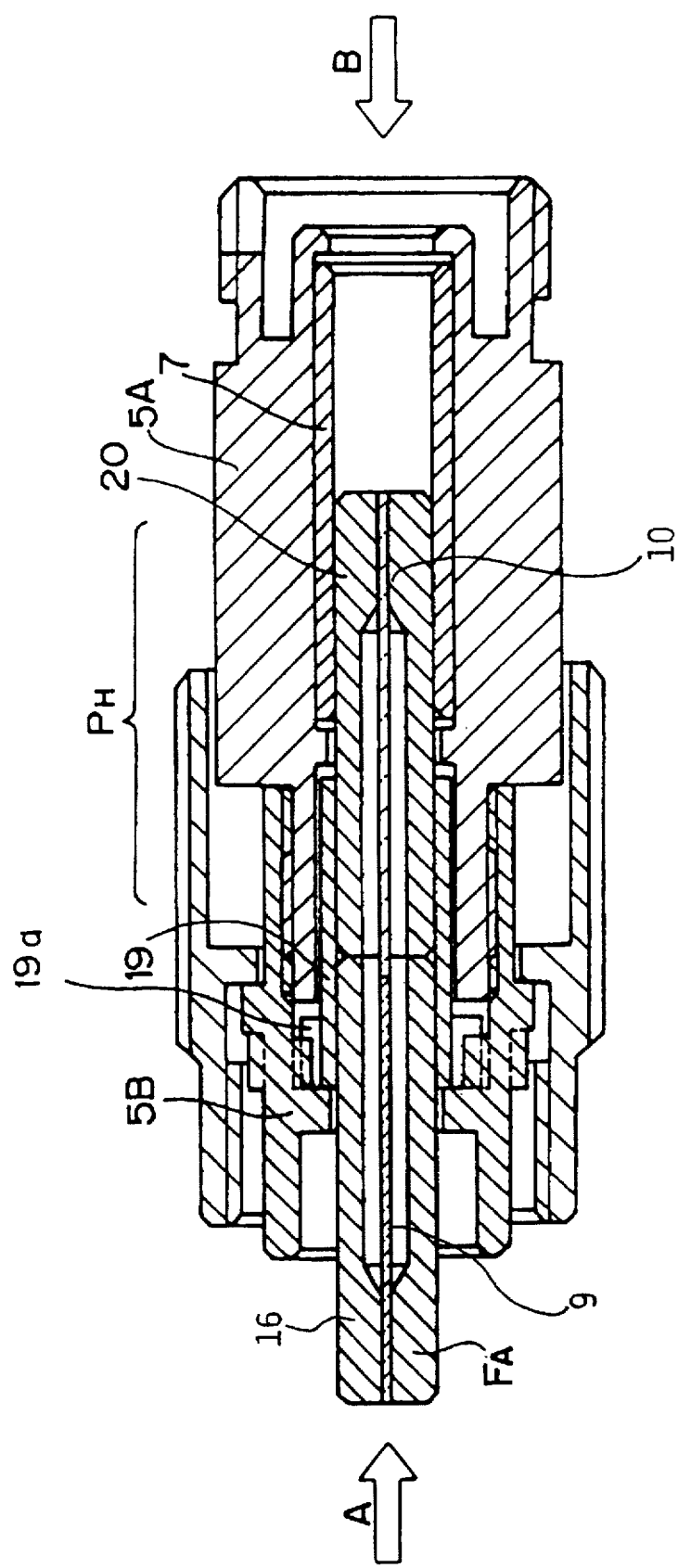
FIG. 5 is a sectional view of an example of an optical attenuator of the present invention in which the optical attenuation fiber assembly of FIG. 4 is built into a plug housing.

FIG. 5 is a sectional view of an example of an optical attenuator of the present invention, in which the aforementioned optical attenuation fiber assembly (FA) is built into the plug housing (PH) of a single-core optical fiber connector. The second ferrule 20 provided on the ordinary optical fiber side of the optical attenuation fiber assembly (FA) is inserted into and coupled to the alignment sleeve 7 provided in the plug housing (PH). A flange 19a of the alignment sleeve 19 of the optical attenuation fiber assembly (FA) is sandwiched and held between the body components 5A and 5B of the plug housing in such a manner that the rotation of the flange 19a is restrained. Further, the attenuator can be inserted into an optical fiber line by inserting optical fibers into the attenuator from the directions of arrows A and B, respectively, and connecting optical fibers with each other.

Figure 6:
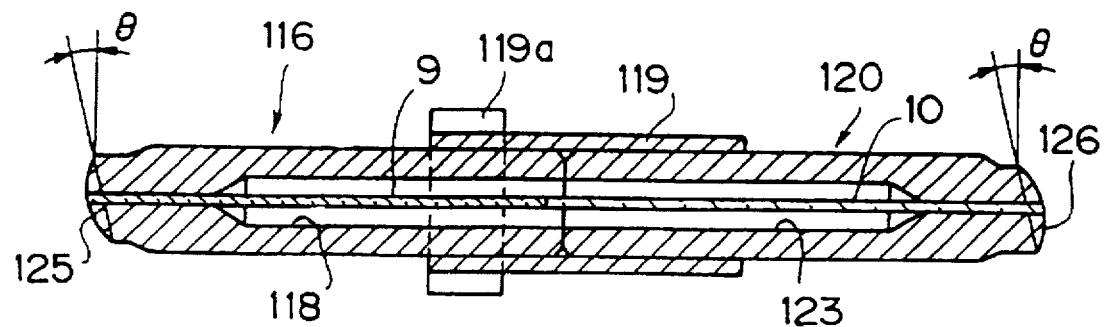
FIG. 6 is a sectional view of another optical attenuation fiber assembly embodying the present invention, namely, another embodiment of the present invention.

FIG. 6 is a sectional view of another optical attenuation fiber assembly embodying the present invention, namely, another embodiment of the present invention. In the case of this embodiment, an optical attenuation fiber connection assembly (F) consists of an optical attenuation fiber 9 and an ordinary optical fiber 10. The method of manufacturing or assembling this optical attenuation fiber connection assembly (F) is the same as described in FIGS. 1 and 2. A ferrule 116 has thin tip end portions. Further, a hole 118 with a stepped hole portion for accepting and supporting an optical fiber is bored into the ferrule 116. Moreover, an end portion of the optical attenuation fiber 9 is accepted by and glued and fixed to the hole 118 for accepting and supporting an optical fiber. Similarly, a ferrule 120 has thin tip end portions. Further, a hole 123 with a stepped hole portion for accepting and supporting an ordinary optical fiber 10 is bored in the ferrule 120. Moreover, an end portion of the ordinary optical fiber 10 is accepted by and glued and fixed to the hole 123 for accepting and supporting an optical fiber. Each of the ferrules 116 and 120 is inserted into and fixed to a sleeve 119 with a flange 119a.

An end portion 125 of the ferrule 116 and an end portion 126 of the ferrule 120 are formed as surfaces inclined at angles (θ) of 8 degrees or more to planes which are perpendicular to the optical axis of the assembly and are polished into spherical surface.

Figure 7:
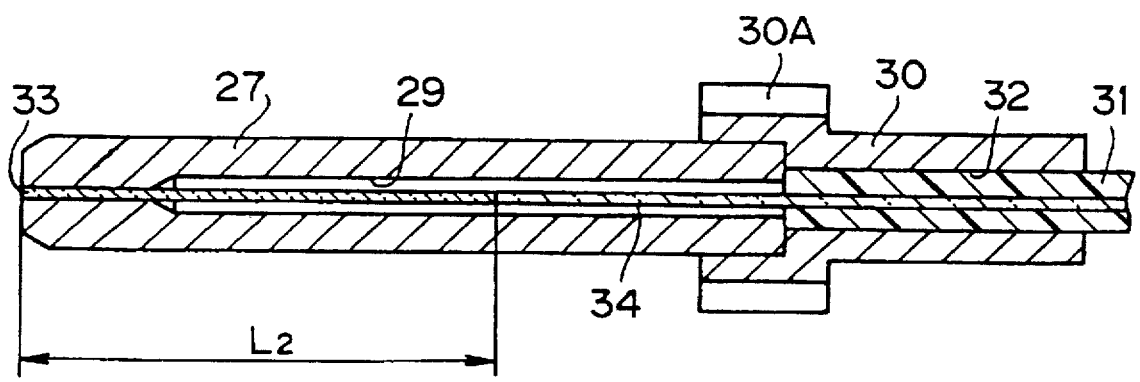
FIG. 7 is a sectional view of still another optical attenuation fiber assembly embodying the present invention, namely, still another embodiment of the present invention, in which the optical attenuation fiber connection assembly of the present invention is built into an optical connector ferrule.
Figure 8:
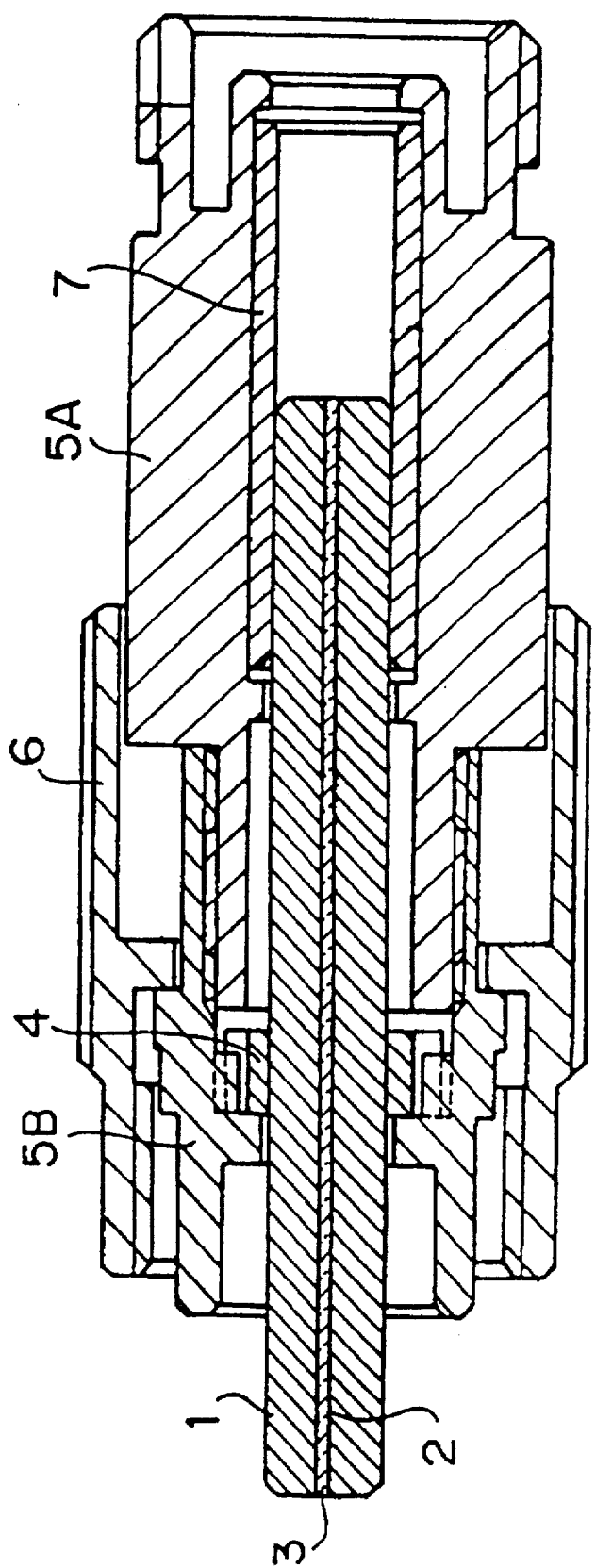
FIG. 8 is a sectional view of an optical attenuator, which is produced by building only the optical attenuation fiber into a single-core optical fiber connector, for illustrating a problem caused therein.
Figure 9:
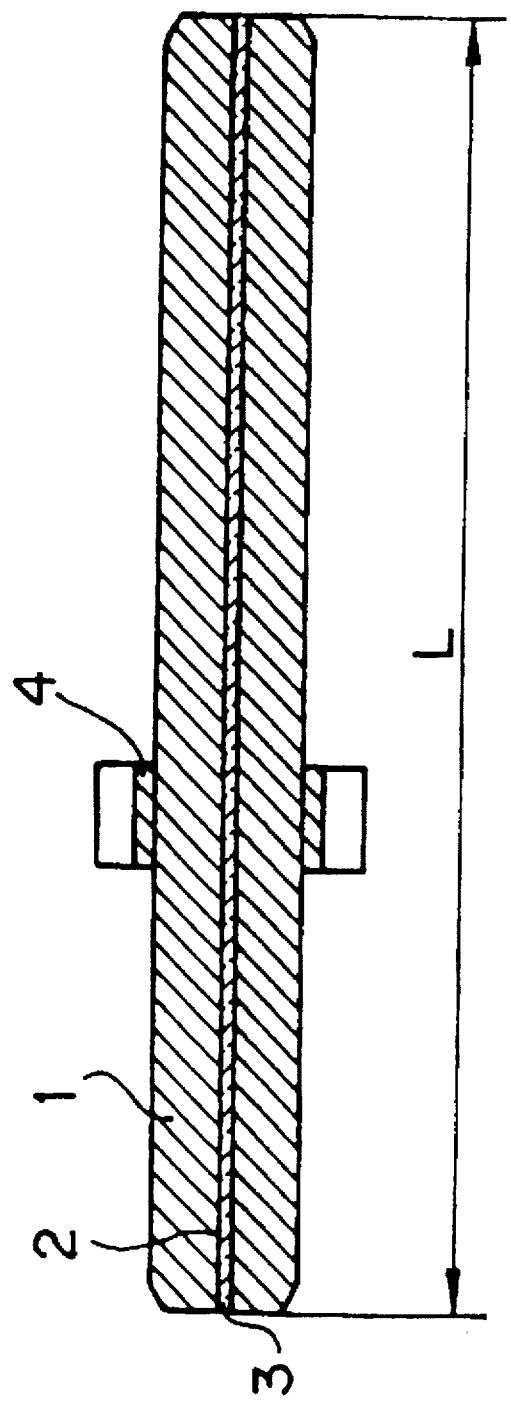
FIG. 9 is a sectional view of a ferrule assembly portion taken out of the optical attenuator of FIG. 8.

FIG. 7 is a sectional view of still another optical attenuation fiber assembly embodying the present invention, in which an optical attenuation fiber connection assembly (F) of the present invention is built into an optical connector ferrule.

An optical attenuation fiber 33 is connected to an ordinary optical fiber 34, from which a covering portion 31 of an ordinary optical fiber is eliminated, by performing a discharge arc welding.

The optical attenuation fiber 33 is cut at an end thereof in such a manner as to become slightly longer than the length designated by $L_2$ in this figure. A covering portion 31 of the ordinary optical fiber 34 is inserted into a hole 32 of a pipe 30 with a flange 30A and is fixed thereto. The connecting point of the optical attenuation fiber 33 and the ordinary optical fiber 34 is located in a stepped hole 29. This is because there is concern that the optical attenuation fiber 33 and the ordinary optical fiber 34 cannot be inserted into the same central minute through hole of the ferrule 27 owing to the fact that the optical axes of the optical attenuation fiber 33 and the ordinary optical fiber 34 cannot be aligned (namely, owing to the misalignment between the optical axes thereof) at the fusion splicing connection portion therebetween, and to the deformation of these optical fibers.

Furthermore, a stepped hole is counterbored in a flange-side portion of the hole 32 of the pipe 30. The base portion of the ferrule 27 is inserted into this counterbored hole and is fixed thereto. The end portions of the optical attenuation fiber 33 and the ferrule 27 surrounding this fiber are polished simultaneously. This assembly is used as an optical connector having an optical attenuation function.

As above described, it is difficult to stably produce optical attenuation fibers, each of which exhibits a predetermined value of optical attenuation per unit length thereof. However, even in the case of using an optical fiber, which causes a large error in optical attenuation, an optical attenuation fiber assembly exhibiting accurate optical attenuation can be produced by employing an optical attenuator which uses an optical attenuation fiber of the present invention.

Moreover, a large number of optical attenuation fiber assemblies, which exhibit arbitrary optical attenuation, can be easily produced. Furthermore, only the regulation of the length of the optical attenuation fiber is necessary to regulate the optical attenuation caused by the optical attenuation fiber assembly. For such a purpose, it is not necessary to regulate other components, for example, to change the length of a ferrule.

Although the preferred embodiments of the present invention have been described above, it should be understood that the present invention is not limited thereto and that other modifications will be apparent to those skilled in the art without departing from the spirit of the invention. Further, the optical attenuation fiber assembly of the present invention can be incorporated into optical devices, each of which is required to have an optical attenuation function, other than the aforementioned embodiments.

What is claimed is:

1. An optical attenuation fiber assembly, comprising:
   an optical attenuation fiber having a first end and a second end, said optical fiber being doped to have a first attenuation;
   an ordinary optical fiber having a first end and a second end, the first end being connected to the first end of the optical attenuation fiber; and
   a first ferrule having first and second ends for accepting and fixing the second end of the optical attenuation fiber, wherein the optical attenuation fiber is shortened to obtain a predetermined second attenuation when connected to the ordinary optical fiber.

2. The optical attenuation fiber assembly according to claim 1, wherein the connection between the optical attenuation fiber and the ordinary optical fiber is made by fusion splicing using a discharge arc.

3. The optical attenuation fiber assembly according to claim 1, wherein the second end of the ordinary optical fiber is cut to a fixed length, fixed to a second ferrule having first and second ends, and polished, wherein the first end of the second ferrule is coupled to the first end of the first ferrule through an alignment sleeve, and wherein the optical attenuation fiber assembly has an optical axis.

4. The optical attenuation fiber assembly according to claim 3, wherein an angular positioning flange is an integral part of the alignment sleeve.

5. The optical attenuation fiber assembly according to claim 3, wherein the second end of the optical attenuation fiber and the second end of the first ferrule and the second end of the ordinary optical fiber and the second end of the second ferrule are polished slantwise with respect to a plane perpendicular to the optical axis of the optical attenuation fiber assembly.

6. The optical attenuation fiber assembly according to claim 3, wherein the second ends of each of the first and second ferrules are inclined at an angle of 8 degrees or more to a plane perpendicular to the optical axis of the optical attenuation fiber assembly and polished into spherical surfaces.

7. The optical attenuation fiber assembly according to claim 1, wherein the first ferrule is an optical fiber connector ferrule, and wherein the second end of the ordinary optical fiber has a covering portion that is fixed within a hole in a pipe having a flange, the pipe being secured to the first ferrule.

8. An optical attenuation fiber assembly having an optical axis, comprising:
   a first optical fiber having a first end and a second end, the first optical fiber being doped to have a predetermined first attenuation, the attenuation of the doped first optical fiber being reduced to a predetermined second attenuation by decreasing the length thereof;
   a second optical fiber having a first end and a second end, the first end of the second optical fiber being connected to the first end of the first optical fiber;
   a first ferrule having first and second ends for fixedly holding the second end of the first optical fiber;

a second ferrule having first and second ends for fixedly holding the second end of the second optical fiber, the first end of the second ferrule being coupled to the first end of the first ferrule; and a first alignment sleeve, the alignment sleeve coupling the first end of the first ferrule to the first end of the second ferrule.

9. The optical attenuation fiber assembly according to claim 8, wherein the attenuation of the second optical fiber is reduced by decreasing the length thereof.

10. The optical attenuation fiber assembly according to claim 8, wherein the connection between the first end of the first optical fiber and the first end of the second optical fiber is made by fusion splicing using a discharge arc.

11. The optical attenuation fiber assembly according to claim 8, further comprising:

an angular positioning flange on the first alignment sleeve; and a plug housing having a second alignment sleeve, a first body component and a second body component;

wherein the second ferrule is inserted into and coupled with the second alignment sleeve of the plug housing and the angular positioning flange is held between the first and second body components of the plug housing.

12. The optical attenuation fiber assembly according to claim 8, wherein the second ends of the first optical fiber, the first ferrule, the second optical fiber and the second ferrule are polished slantwise with respect to a plane perpendicular to the optical axis of the optical attenuation fiber assembly.

13. The optical attenuation fiber assembly according to claim 8, wherein the second ends of each of the first and second ferrules are inclined at an angle of 8 degrees or more to a plane perpendicular to the optical axis of the optical attenuation fiber assembly and polished into spherical surfaces.

14. An optical attenuation fiber assembly, comprising:

a first optical fiber having a first end and a second end, the first optical fiber being doped to have a predetermined first attenuation, the attenuation of the doped first optical fiber being reduced to a predetermined second attenuation by decreasing the length thereof;

a second optical fiber having a first end, a second end and a covering portion on the second end, the first end of the second optical fiber being connected to the first end of the first optical fiber;

an optical fiber connector ferrule having first and second ends for accepting and fixedly holding the second end of the first optical fiber; and a pipe having a flange and a hole for accepting and fixedly holding the covering portion of the second optical fiber, said pipe being secured to the first end of the optical fiber connector ferrule.

15. A method of creating an optical attenuation fiber assembly, comprising the steps of:

fusion splicing an end surface of a first optical fiber having a first attenuation through doping to an end surface of a second optical fiber having no predetermined attenuation;

shortening the first optical fiber to a specific length to obtain a predetermined second attenuation;

cutting the second optical fiber to a specific length;

inserting and fixedly securing the first end of a first ferrule within an alignment sleeve; and inserting and fixedly securing the free end of the first optical fiber within a through hole in the first ferrule.

16. The method of creating an optical attenuation fiber assembly according to claim 15, further comprising the steps of:

inserting and fixedly securing the free end of the second optical fiber within a through hole in a second ferrule having first and second ends;

inserting and fixedly securing the first end of the second ferrule within the alignment sleeve, whereby the first ends of the first and second ferrules are coupled; and polishing the surfaces of the second ends of the first and second ferrules.

17. The method of creating an optical attenuation fiber assembly according to claim 15, further comprising the steps of:

inserting and fixedly securing the free end of the second optical fiber within a hole in a pipe, said free end of the second optical fiber having a covering and said pipe having a flange;

counterboring a stepped hole in the flange side portion of the hole of the pipe;

inserting and fixedly securing the first end of the first ferrule within the counterbored hole in the pipe; and polishing the second end of the first ferrule and the free end of the first optical fiber simultaneously.

* * * * *